May 31, 1938. L. R. TEEPLE 2,119,187
THERMOPERIODIC CONTROL FOR COAL STOKERS
Filed March 18, 1933 3 Sheets-Sheet 1
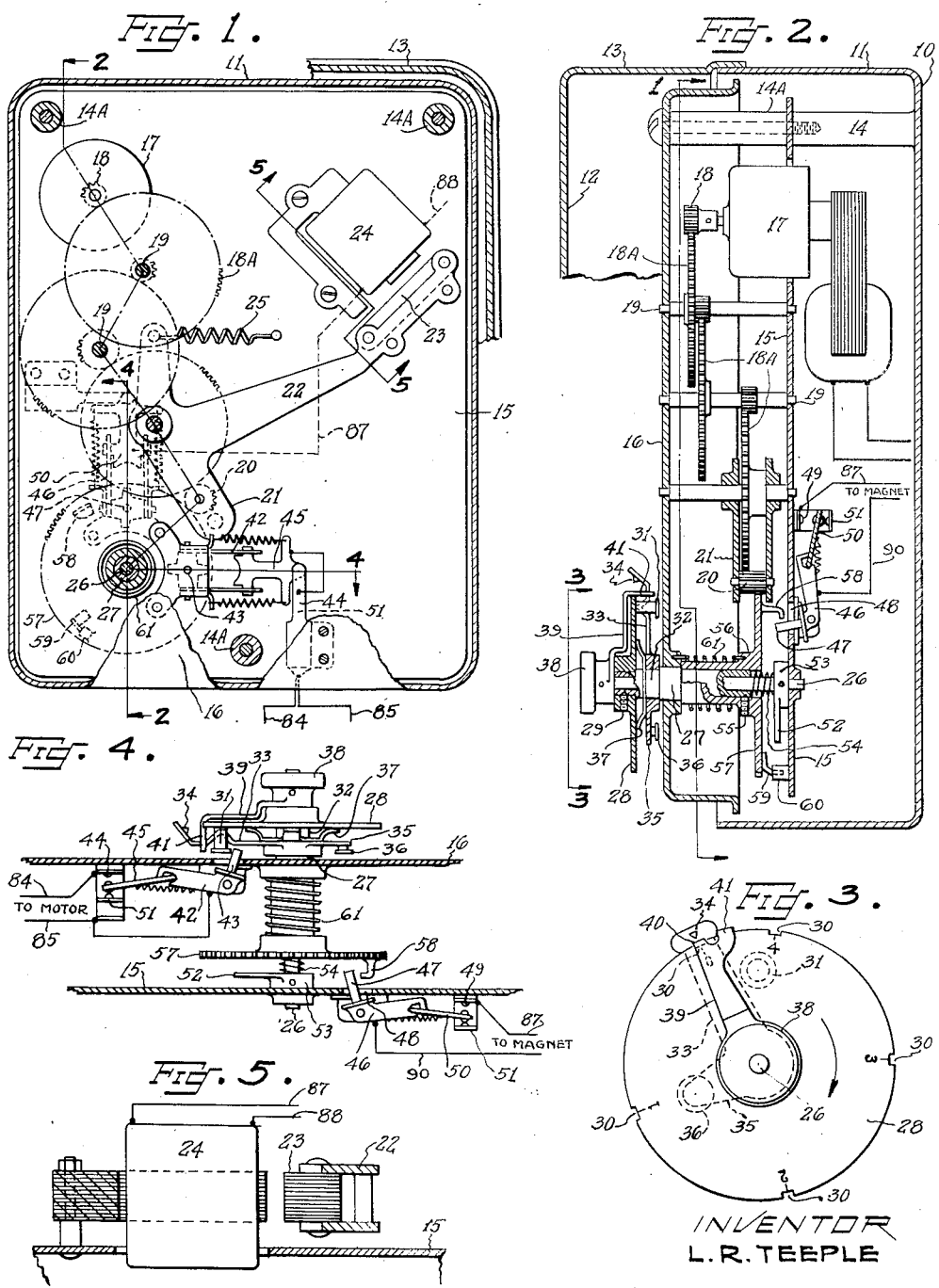
INVENTOR
L. R. TEEPLE
BY
ATTORNEY May 31, 1938.  L. R. TEEPLE  2,119,187
THERMOPERIODIC CONTROL FOR COAL STOKERS
Filed March 18, 1933  3 Sheets-Sheet 2
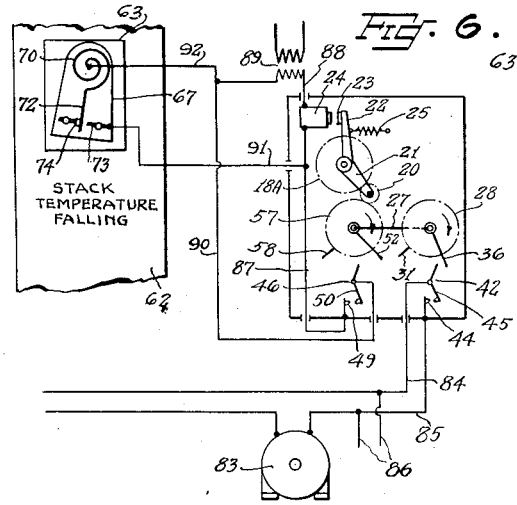
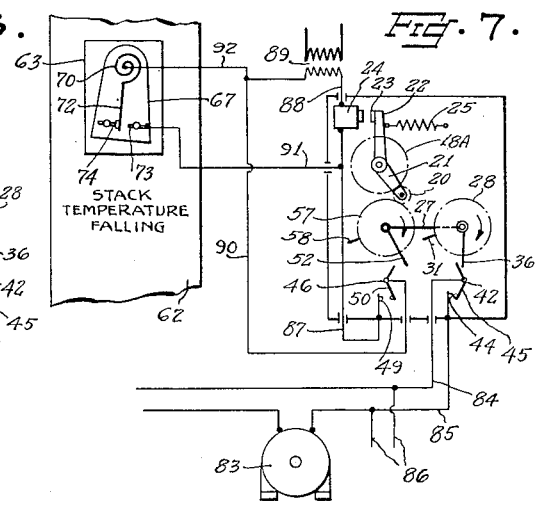
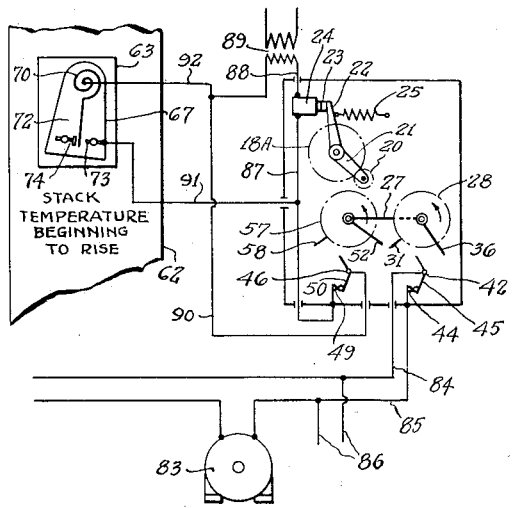
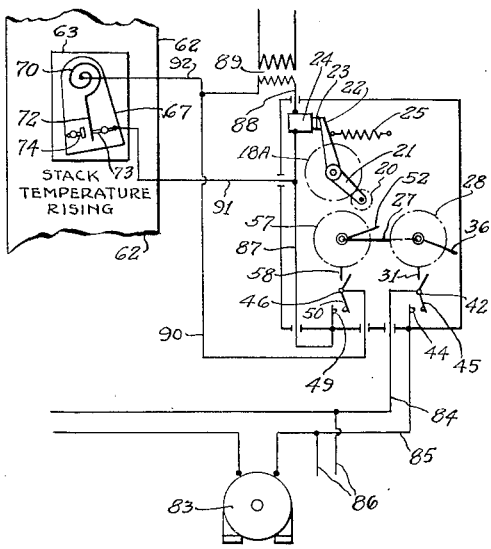
INVENTOR
L. R. TEEPLE
BY
ATTORNEY

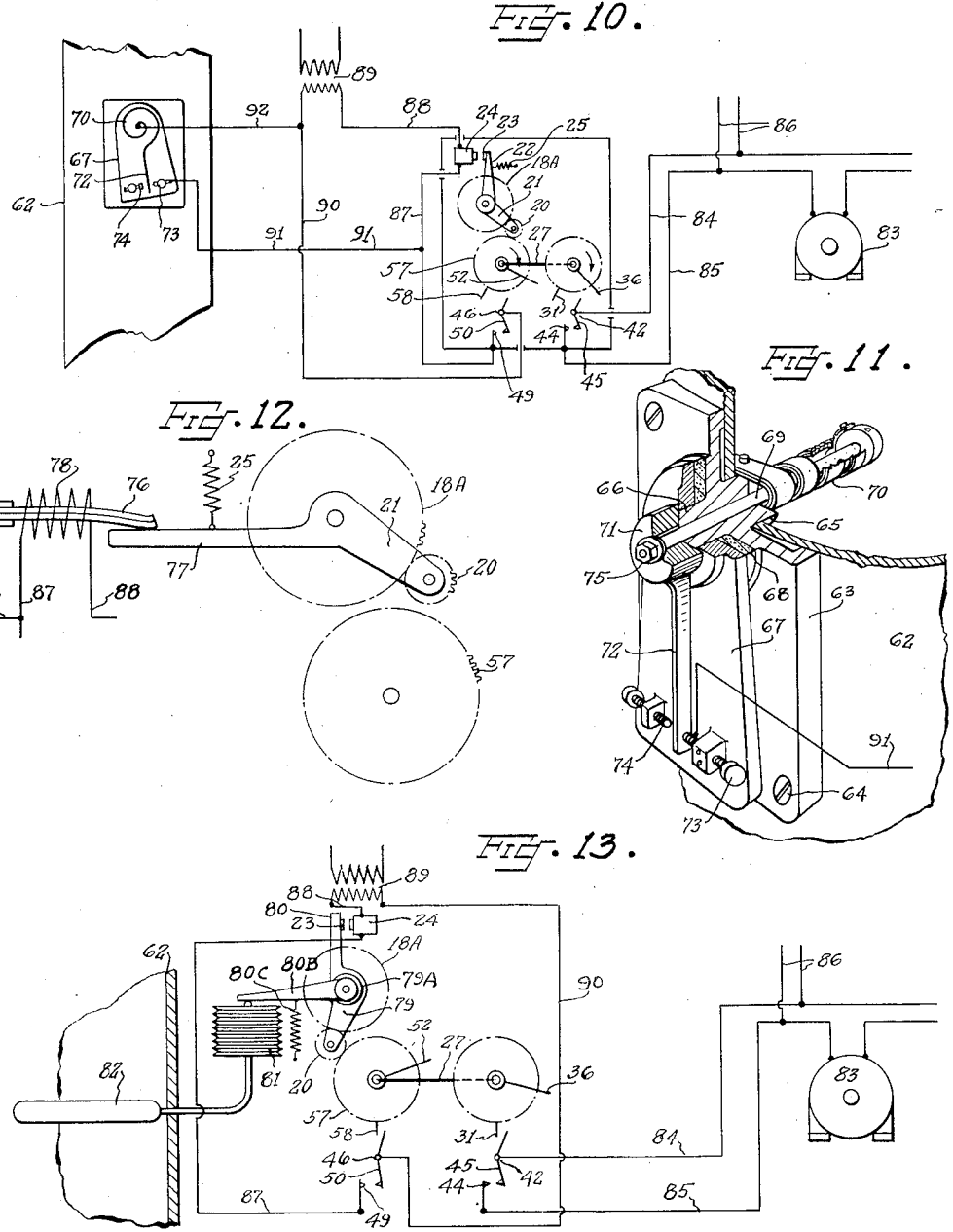

Patented May 31, 1938

2,119,187

UNITED STATES PATENT OFFICE 2,119,187

THERMOPERIODIC CONTROL FOR COAL STOKERS

Lawrence R. Teeple, Portland, Oreg.

Application March 18, 1933, Serial No. 661,452

16 Claims. (Cl. 236—46)

This invention relates generally to controls for coal stokers, and particularly to a thermo periodic control therefor.

The main object of this invention is to provide an auxiliary stoker control by means of which a stoker is made to re-fuel a furnace after a fixed period of time measured from a decline in temperature at any point of the entire temperature range of an object to which heat may flow from the stoker being controlled, such as the furnace itself, smoke stack, radiator, or even a room to which heat liberated by the stoker may flow.

The second object is to provide means for preventing heat stratification and for other applications which require periodic operations limited by pressure or temperature conditions.

Before entering into a description of this device it must be understood that previous devices intended for this purpose have been solely based on a single element, with periods of refueling operation being determined either by a fixed time interval, by the temperature of the stack, or by some other factor which roughly indicates the condition of the fire. These factors, however, do not alone approximate fire conditions closely enough to be entirely satisfactory. Periodic refueling does not take into account the normal operation of the stoker from the temperature or pressure control instruments which operate the stoker, and therefore refuel the fire, at irregular intervals. Consequently its use is only permissible when checked by a limit control. Refueling from stack temperature is accomplished by operating the stoker to maintain a minimum temperature in the stack, but this method often results in unnecessarily frequent operation. Also the temperature of the stack is not a sufficiently exact indication of the fire since it is affected by other factors, such as depth of fuel bed and length of previous operation. Likewise other single factors, such as the depth of the fuel bed, cannot alone be depended upon to indicate fire condition.

With my device refueling for the purpose of merely maintaining a fire is not dependent upon the passing of one or more fixed temperature points or the departure from a limited temperature contained between fixed minimum and maximum settings, but solely by a downward direction of temperature change. That is, if the object being heated as a result of the stoker operation is undergoing a rise in temperature then there is no occasion for refueling, and the refueling mechanism remains inoperative, but if the temperature of the same object falls at any portion of its entire range of temperature then the refueling mechanism will begin to measure off a fixed period of time toward or at the close of which the stoker will be operated for a limited time for refueling purposes, unless it has been operated by its other or usual controls sufficiently to reverse the direction of temperature change.

These, and other objects, will become more apparent from the specification following as illustrated in the accompanying drawings, in which:

Fig. 1 is a section of the control along the line 1—1 in Fig. 2.

Fig. 2 is a section taken along the line 2—2 in Fig. 1.

Fig. 3 is an elevation of the setting disk taken along the line 3—3 in Fig. 2.

Fig. 4 is a developed section taken along the line 4—4 in Fig. 1 showing the switches.

Fig. 5 is a section along the line 5—5 in Fig. 1 showing the electromagnet.

Fig. 6 is a diagrammatic view illustrating a condition in which the stack temperature is low and falling and in which the stack thermostat is open and the timing mechanism is operating.

Fig. 7 is similar to Fig. 6 but showing the end of the first timed period and showing the refueling switch closed to start the stoker motor.

Fig. 8 is similar to Fig. 7 but showing the end of the second timed period with both switches closed, the magnet energized, the pinion out of mesh and the parts returning to the re-cycling or zero position.

Fig. 9 is a diagrammatic view showing a condition of high stack temperature in which the stack thermostat is closed and the temperature is increasing, due to the motor being operated by other controls in which the pinion remains out of mesh due to the fact that the magnet is now energized through the stack thermostat instead of through its control switch.

Fig. 10 shows the stack commencing to cool and the stack thermostat open or floating with the magnet completely de-energized and the pinion in mesh at the starting point of a new cycle.

Fig. 11 is a perspective view of the special form of thermostat switch with parts broken away in section.

Fig. 12 is a fragmentary view of an alternative actuator for the re-cycling mechanism in which a bi-metallic strip is deflected by heat from a resistor.

Fig. 13 shows a second modification in which the re-cycling mechanism is actuated mechanically from stack temperature and electrically from the timed switching mechanism.

Time controlled switching mechanism

Referring in detail to the drawings, there is shown a case including a back 10 around which are formed the side walls 11. A closure 12 is provided whose side walls 13 extend around the outside of the walls 11. From the back 10 extend the pillars 14 in front of which are mounted the back plate 15 which is spaced from the front plate 16 by the tubes 14-A.

Mounted on the back plate 15 is a synchronous motor 17 whose pinion 18 drives a train of reduction gears 18-A whose pivots 19 journal in the plates 15 and 16 and whose end pinion 20 is carried on a forked arm 21 adapted to swing on a center lying along the axis of its driving gear. The arm 21 is provided with extensions 22 which carry the armature 23 of an electromagnet 24, which is secured to the back plate 15. The armature 23 is normally urged away from the magnet 24 by gravity and the spring 25.

Journaling in the plate 15 is a pivot 26 whose opposite end journals in a tubular shaft 27 which, in turn, journals in the front plate 16. A dial 28 is secured on the outer end of the tubular shaft by means of a set screw 29. The dial 28 is provided with a series of notches 30 which, in this instance, are numbered from naught to four and represent one hour periods. Obviously, any other divisions of time may be employed.

On the back of the dial 28 is rigidly secured a motor stop pin 31. On the reduced portion 32 of the shaft 27 is rotatably mounted a refueling arm 33 which carries an indicator point 34 outside of the circumference of the dial 28. The refueling arm 33 has a lateral extension 35 on which is mounted a motor starting pin 36. The arm 33 is frictionally held to turn with the shaft 27 by means of a friction spring 37 which re-acts against the dial 28.

On the outer end of the pivot 26 is secured a knob 38 to which is attached a recycling indicator arm 39. A rearwardly turned tip 40 releasably and slidably engages the notches 30 in the dial 28. The recycling arm 39 carries a backwardly turned lug 41 which intersects the plane of rotation of the refueling arm 33. On the rear side of the plate 16 is mounted a refueling toggle switch 42 whose operating arm 43 extends through an opening in the plate 16 into the path of the pins 31 and 36. The details of the switch 42 are immaterial except that it is desirable to provide two-way connections for use with low voltage intermediate operating instruments if desired.

For the purpose of explanation the contact point 44 and contact lever 45 only will be referred to.

On the back of the plate 15 is mounted a recycling toggle switch 46 whose operating arm 47 extends through an opening 48 into the space between the plates 15 and 16. The switch 46 is provided with a contact point 49 and contact lever 50 and is in all respects identical with the switch 42. Each of the switches 42 and 46 is provided with a dead point or stop 51 for low voltage installations, as suggested above.

Pinned to the pivot 26 is a cycle ending cam arm 52 between whose hub 53 and the rear end of the shaft 27 is interposed a compression spring 54 whose function it is to permit the tip 40 to be disengaged from its notch 30 under a pull on the knob 38, which may then be turned for the purpose of varying the total length of a cycle—that is, one period of refueling plus the following period of inoperation, or the reverse.

Reference is made herein to operations arising from the action of the control itself independent of the usual room and furnace temperature or pressure-actuated switches.

Secured on the shaft 27 by means of a set screw 55 is the hub 56 of the gear 57 with which the end pinion 20 meshes shortly after the magnet 24 is de-energized, which occurs at the end of a complete cycle and will be explained later.

On the rear side of the gear 57 is the recycling arm 58 which is in the form of a cam and which operates to open the recycling switch 46 at the end of the cycle. The gear 57 is provided with a stop lug 59 which engages the stop 60 on the plate 15, which stop lug 59 automatically returns to the zero or rest position when the pinion 20 is drawn out of mesh when the magnet 24 is energized.

A torsion spring 61 rotates the gear 57 in a direction opposite to that in which it is driven by the pinion 20 whenever the pinion 20 is disengaged.

Directional type thermostat

This portion of the device may vary greatly in form depending upon the particular adaptation involved. In whatever form it may be constructed, however, it incorporates an original and necessary self-setting feature such that its high and low settings will be determined and changed by the element acting on a contact-bearing plate, and moving it in accordance with the maximum and minimum points reached in the stack with each reversal of temperature. This feature divorces thermostat setting from any fixed value and makes it a variable factor dependent solely upon direction of temperature change. In other words, the thermostat makes contact as temperature begins to rise and breaks contact as temperature begins to fall, regardless of temperature values.

In Fig. 11 is shown a representative form which may be attached to a stack 62 and comprises a base 63 which is secured to the outer surface of the stack 62 by means of screws 64. The base 63 has an inwardly projecting boss 65 and an outwardly projecting boss 66, which latter serves as a pivot for a rockable arm 67, which is separated from the base 63 by a friction washer 68.

Journaling in the base 63 and projecting from the bosses 65 and 66 is the shaft 69, on the inner end of which is secured one end of a torsional thermostatic element 70, its other end being secured to the boss 65. Splined on the shaft 69 is a hub 71 which has projecting therefrom an arm 72 whose lower end swings between a contact screw 73 and an adjusting screw 74, both of which are carried by the arm 67.

It will be understood that the screw 73 is insulated from the arm 72 when not in engagement therewith. The shaft 69 is threaded to receive a nut 75 by means of which the desired frictional engagement may be maintained. The element 70 itself acts as a spring, making it possible to easily adjust the friction device.

In the diagram shown in Fig. 12 the end pinion 20 is moved out of mesh with the gear 57 by the action of a bi-metallic thermostat 76 which bears against the arm 77, which is substituted for the arm 22 in the first described form of the device. In this form of the device the heating coil 78 is energized by the closing of the stack thermostat 70 (as shown in Fig. 11) the element 76 being used as a substitute for the magnet 24, thereby eliminating magnet noises.

In the form of the device shown in Fig. 13 the pinion 20 is mounted on the end 79 of a lever whose opposite end 80 carries the armature 23 of the magnet 24.

The lever 80-B can transmit motion to the lever end 79 through the friction washer 79-A. The lever 80-B is urged by a spring 80-C toward the sylphon bellows 81 which communicates with the stack tube 82 which is filled with volatile liquid.

The net result of the operation of this form of the device (as shown in Fig. 13) is identical with that of the form previously described.

When the temperature in the stack 62, or at any other controlling point where the tube 82 is located, falls below any point along its entire temperature range—that is, when there occurs a temperature drop—the bellows 81 contracts and permits the spring 80-C to move the rotating pinion 20 into mesh with the gear 57, provided of course it is not being held out by the magnet 24 arising from an action within the switching mechanism itself. There is commenced therefore by this drop in stack temperature the measurement of a period of motor inoperation which is followed by a measured period of motor operation. Reference is made of course to periods of motor operation or inoperation set up by this contacting device itself.

In other words, in this form of the device the shifting of the starting point from which a cycle is measured occurs at the gear train, while in the first described form of the device it occurs at the stack thermostat.

In order to explain the function of the device there is shown a motor 83 which constitutes the prime mover for the stoker. The motor 83 is supplied with current through the wires 84 and 85 from a power circuit in response to ordinary heating requirements by means of some form of control (not shown) adapted to close the motor circuit across the control leads 86.

My device is of course intended to serve a different purpose, namely to maintain the fire by refueling the furnace while other demands coming in over the wires 86 are insufficient to maintain a fire, and my object is not merely to maintain the fire, since this has been done in many different ways, but to do so to the best possible advantage in other directions as well.

One side of the magnet 24 is joined by a lead wire 87 to the contact point 49 of the recycling switch 46, and the other side of the magnet 24 is joined by a lead wire 88 of a transformer 89 from whence the lead 90 returns to the contact lever 50 of the recycling switch 46. A lead 91 connects the lead 87 with the contact screw 73 of the stack thermostat 70 which, for the sake of clearness, is conventionally shown in the diagrams.

The thermostat 70 is joined by a lead 92 to the lead 90. The refueling side of the mechanism has the contact point 45 of the recycling switch 42 connected to the power lead 85, and the contact lever 45 is connected to the power lead 84.

The operation of the controls as shown in Figs. 1 to 11 inclusive is as follows: In Fig. 6 is illustrated a condition under which my control takes charge of the stoker (assuming the absence of calls for heat from any other control element). This is a condition of falling stack temperature in which the magnet 24 is de-energized at the contact screw 73, the rotating pinion 20 is meshing with the gear 57 and there has commenced the measurement of a timed period of motor inoperation.

The gear 57 having started from its rest or zero position is now driven by the pinion 20, carrying with it the dial 28. At the end of this timed period of motor inoperation—for example three hours—the motor starting pin 36 closes the refueling switch 42 and starts the stoker motor 83, which continues to run for a short period—for example ten minutes—which constitutes what is referred to herein as the refueling period, (see Fig. 7) at the close of which the cycle-ending cam arm 52 closes the recycling switch 46 which magnetizes the magnet 24, thereby unmeshing the pinion 20 and permitting the gear 57 to return to its zero position (see Fig. 8) under the action of the spring 71, which has been wound by the opposite rotation of the gear 57 during the time measuring period.

This return action of the gear under the influence of the spring 61 causes both of the switches 42 and 46 to open under the action of the motor stopping pin 31 and recycling arm 58, and if the stack thermostat switch is closed, due to an increase in the stack temperature (as shown in Fig. 9), then the automatic cycling is stopped; but if the stack thermostat is still open (as shown in Fig. 6) the recycling will be repeated until terminated by a rise in the stack temperature as a result thereof, or terminated as the result of the operation of the stoker from some of its other controls.

The operation of the form of the device shown in Fig. 12 is no different than that just described, except that there may be introduced into the operation any desired lag in the functioning of the recycling mechanism.

It will be seen by an inspection of Fig. 11 that the arm 67 can be swung on its pivot by means of the arm 72 which is actuated by the thermostat 70, but the arm 67 will remain in any position to which it is moved. Therefore, if the temperature of the stack rises and the arm 72 contacts the screw 73 sufficiently it will carry the arm 67 before it, changing thereby its starting point from which a reverse of direction is to be gaged.

It will be seen that wherever the contact screw 73 stops at the end of a temperature rise and the beginning of a temperature fall that point will be the beginning of the next timed cycle above referred to.

Throughout the foregoing description reference has been made to a stack, but it will be apparent to anyone familiar with heating problems that the device herein described has numerous other applications. For example, the portion illustrated in Fig. 11, or its equivalent, may be attached to a radiator for the purposes hereinbefore described, the principal one being that of the prevention of heat stratification. This is accomplished by a momentary stimulation of the heat supplied to the radiator at definitely timed intervals after it starts to cool, thereby inducing circulation which will break up the stratification above referred to.

Numerous other applications of this invention will suggest themselves to those familiar with this and allied arts.

I claim:

1. A thermo periodic control for coal stokers having in combination a time controlled switching mechanism including spring returned re-cycling and refueling switches, a stack thermostat operatively connected to said switching mechanism whereby same will be rendered inoperative and releasing said switching mechanism to return to a rest position whenever said thermostat is closed by a rise in stack temperature whereby said re-cycling mechanism is rendered operative only during the downward movement of the temperature at said thermostat within any portion of its entire temperature range.

2. A thermo periodic control for coal stokers having in combination a time controlled spring returned refueling switch whereby a motor can be operated for periods of time after measured periods of motor inoperation, a re-cycling switch for releasing said refueling switch to the beginning of its cycle under the influence of its spring and at the same time rendering same inoperative at the commencement of a rise in temperature and rendering said time controlled refueling switch operative at the commencement of a downward movement of temperature during any portion of its temperature range in a manner that said refueling device will commence a measurement of a period of inoperation followed by a period of motor operation successively until the temperature drop is checked and the temperature at the thermostat commences to rise.

3. The substance of claim 2, and means for adjusting the relative lengths of the operative and inoperative periods occasioned by said refueling mechanism.

4. A thermo periodic control for coal stokers having in combination a motor refueling switch whereby a stoker motor may be rendered operative and inoperative in successively measured periods, a time controlled drive for said refueling switch capable of driving same in one direction during a continuous cycle composed of one period of inoperation and one period of operation, a recycling switch actuated by said drive, a thermostat for rendering said drive inoperative during rising temperatures, and spring means for returning said drive to a starting position when same is rendered inoperative.

5. The substance of claim 4, together with a motor driven stoker having automatic controls for operating said stoker when the heat delivered thereby is insufficient for the purpose intended and stopping said stoker when the heat delivered exceeds the desired amount.

6. A control for coal stokers for maintaining a fire therein, comprising a refueling switch for renewing the fire periodically during a fall in temperature at a given point, a recycling switch for interrupting said periodical operation during rising temperatures at the same point, and a stack thermostat for controlling the operation of said recycling switch and releasing said refueling switch in order that it may be spring returned to the start of an inoperative period during a temperature rise.

7. The substance of claim 6, and means for introducing a lag in the action of the recycling mechanism.

8. A thermo periodic control for coal stokers in which are combined a refueling switch by means of which the stoker motor may be started or stopped, a time controlled actuator for closing said refueling switch whereby same may be alternately opened and closed for selectively measured periods, a recycling mechanism for opening said refueling switch whereby the measuring of the periods by said actuator may be interrupted, and a thermostat having floating contact and stop means between which the contact arm of said thermostat can move and whereby an excessive movement of said contact arm will move said stop and contact arm with same operating in conjunction with the aforesaid means in a manner that a movement produced by a rise in temperature will cause said refueling switch to open and a fall in temperature will cause said timing mechanism to begin the measurement of a new cycle.

9. A thermo periodic control for coal stokers comprising in addition to the usual thermostatic controls therefor a time controlled switching mechanism for refueling the fire at fixed intervals of time when there are no calls for heat from said first mentioned controls, a recycling mechanism for returning said switching mechanism to rest including means for controlling the returning of said switching mechanism to said rest position in response to a temperature rise, a thermostat including a movable contact screw and stop, a contact arm movable between the said screw and stop operated by said thermostat, said thermo periodic control constituting a means whereby a movement of said contact arm occasioned by the commencement of a temperature rise will cause said recycling mechanism to move said switching mechanism to an inoperative zero position, and whereby a movement of said arm caused by the commencement of a fall in temperature will cause said timing mechanism to commence the measurement of a period of motor inoperation and to follow same with a period of motor operation.

10. A thermo periodic control for coal stokers having in combination a directional thermostat having a contact arm actuated by changes in temperature, a movable arm along one face of which said contact arm can move, a spaced contact screw and stop mounted on said movable arm on each side of said contact arm, and a switching mechanism for rendering said periodic control operative when said contact arm is not in engagement with said contact screw as occasioned by a fall in temperature and for rendering said periodic control inoperative when said contact arm touches said contact screw as occasioned by a rise in temperature.

11. In a control system for stokers, a motor circuit including a time-controlled switching mechanism including a member movable from an initial position to a position to close the motor circuit to start the stoker, temperature-governed means for rendering the switching mechanism inoperative whenever such means is responding to a rising temperature, and means for recycling the mechanism from initial position after a chosen lapse of time in absence of such rising temperature.

12. In a stoker re-fueling control of the type which initiates re-fueling operation of the stoker after a measured period of descending stack temperature, and terminates said operation upon a resultant rise of stack temperature, additional means whereby the stoker re-fueling mechanism begins a subsequent cycle following any measured period of re-fueling operation not accompanied by rise of stack temperature.

13. In a control system for stokers, a motor circuit including a thermostat and a switch either of which alone can close the motor circuit, a member constantly urged to an initial position, time-controlled means normally urged into driving engagement with said member and when so engaged to move the member from initial position to position to close said switch after a chosen lapse of time, temperature-controlled means for causing the time-operated means to disengage the member whenever the temperature-controlled means is responding to a rising temperature, and means for disengaging the member after a chosen lapse of time in absence of said rising temperature.

14. The method of feeding fuel in an electrically operated and controlled furnace stoker heating system which consists in feeding fuel at spaced intervals of time in absence of calls for heat from the space being heated, and until the stack temperature rises, and in absence of such temperature rise feeding the fuel for definite periods at spaced intervals of time greater in duration than said first intervals of time.

15. In a stoker control, a refueling switch for closing the motor circuit to start the stoker, time-controlled means for closing the switch, and a recycling switch for interrupting the operation of said time-controlled means upon a lapse of time after closing of the refueling switch and thereupon returning the time controlled means to initial position, a thermostat for interrupting the operation of said time-controlled means whenever the temperature affecting the thermostat is rising along any portion of its entire temperature range, whereby the stoker will run for a chosen period of time after a chosen period of inoperation.

16. The combination of a timed re-fueling device for coal stokers adapted to operate the stoker recurrently for predetermined periods to maintain fire, and means for interrupting the operation of the device at any point in its cycle and re-setting the timer to the start of the inoperative portion of its cycle upon an upward trend of combustion temperature.

LAWRENCE R. TEEPLE.